(12) United States Patent
Aarabi

(10) Patent No.: US 9,275,400 B2
(45) Date of Patent: *Mar. 1, 2016

(54) METHOD AND SYSTEM FOR SIMULATED PRODUCT EVALUATION VIA PERSONALIZING ADVERTISEMENTS BASED ON PORTRAIT IMAGES

(71) Applicant: ModiFace Inc., Toronto (CA)

(72) Inventor: Parham Aarabi, Toronto (CA)

(73) Assignee: MODIFACE INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,527

(22) Filed: Mar. 28, 2014

(65) Prior Publication Data

US 2014/0214553 A1    Jul. 31, 2014

Related U.S. Application Data

(63) Continuation of application No. 12/626,323, filed on Nov. 25, 2009, now Pat. No. 8,725,560.

(60) Provisional application No. 61/206,520, filed on Feb. 2, 2009, provisional application No. 61/209,828, filed on Mar. 12, 2009.

(51) Int. Cl.
| | |
|---|---|
| *G06Q 30/00* | (2012.01) |
| *G06Q 30/02* | (2012.01) |
| *G06Q 90/00* | (2006.01) |
| *G06K 9/00* | (2006.01) |

(52) U.S. Cl.
CPC ........ *G06Q 30/0271* (2013.01); *G06K 9/00248* (2013.01); *G06Q 30/02* (2013.01); *G06Q 30/0251* (2013.01); *G06Q 30/0276* (2013.01); *G06Q 90/00* (2013.01)

(58) Field of Classification Search
CPC ... G06Q 30/02; G06Q 30/0251; G06Q 90/00; G06Q 30/0271; G06Q 30/0276; G06K 9/00248
USPC ........................................... 705/14.1
See application file for complete search history.

(56) References Cited

U.S. PATENT DOCUMENTS

| | | | |
|---|---|---|---|
| 8,725,560 B2 * | 5/2014 | Aarabi | G06Q 30/02 705/14.1 |
| 2005/0203724 A1 | 9/2005 | Orpaz et al. | |

* cited by examiner

*Primary Examiner* — Daniel Lastra
(74) *Attorney, Agent, or Firm* — Gowling Lafleur Henderson LLP

(57) ABSTRACT

Advertising method and system for creating a personalized advertisement, and for recommending a product being advertised. An uploaded facial photograph is received, the facial photograph including a plurality of facial features. At least one facial feature of the plurality of facial features is detected. Personal information may be extracted by analyzing the at least one detected facial feature. A product being advertised may be recommended, wherein the recommended product applies to a treatment related to the extracted personal information.

20 Claims, 3 Drawing Sheets

Rich Media Makeover Ads                    powered by ModiFace

Make a cosmetic, weight-loss, anti-aging, or hair color makeover appvertisement in just seconds! Using ModiFace's visualization engine, you can personalize any product instantly and effortlessly.

Current makeover effects supported include facelifts, dermal fillers, injectibles (BOTOX), facial anti-aging, creams, lasers, eyebrow lift, lip augmentation, nose reshaping, smile correction, teeth whitening, eye shadow/definition, upper cheek blush, lower cheeck blush, weight reduction, hair coloring, lipstick, smile correction, cheek lift, jaw restoration, and much MUCH more!

Rich Media Makeover Ads                powered by ModiFace

Make a cosmetic, weight-loss, anti-aging, or hair color makeover appvertisement in just seconds! Using ModiFace's visualization engine, you can personalize any product instantly and effortlessly.

Current makeover effects supported include facelifts, dermal fillers, injectibles (BOTOX), facial anti-aging, creams, lasers, eyebrow lift, lip augmentation, nose reshaping, smile correction, teeth whitening, eye shadow/definition, upper cheek blush, lower cheek blush, weight reduction, hair coloring, lipstick, smile correction, cheek lift, jaw restoration, and much MUCH more!

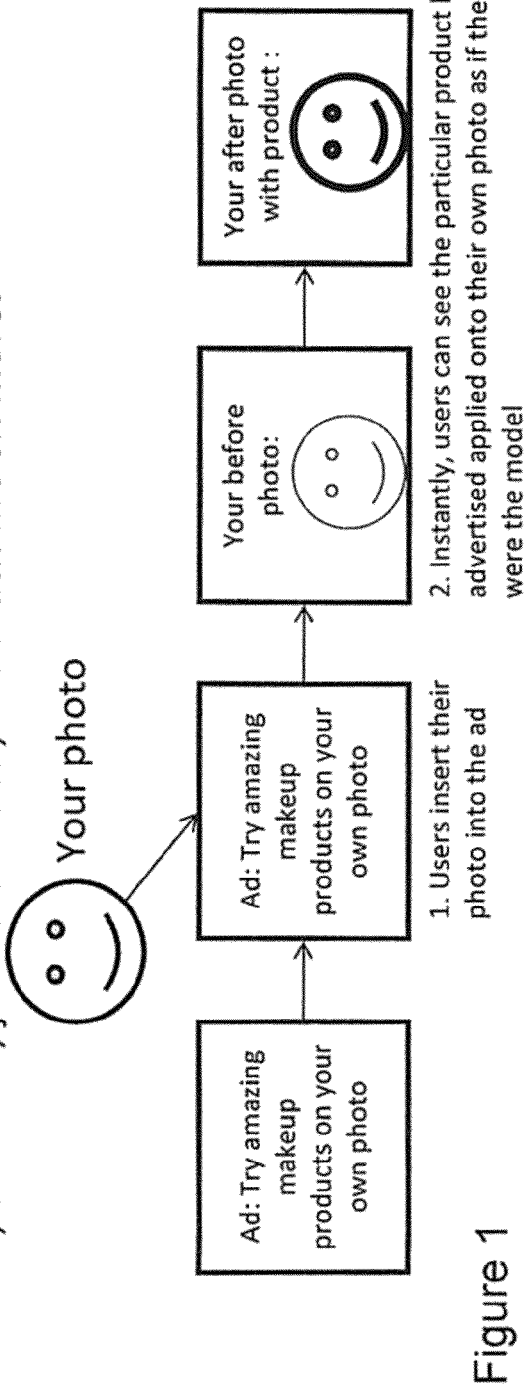

METHOD AND SYSTEM FOR SIMULATED PRODUCT EVALUATION VIA PERSONALIZING ADVERTISEMENTS BASED ON PORTRAIT IMAGES

This application is a continuation of application Ser. No. 12/626,323 filed Nov. 25, 2009 (now U.S. Pat. No. 8,725,560, issued May 13, 2014), incorporated herein by reference, and which claims the benefit of U.S. Provisional Application No. 61/206,520, filed Feb. 2, 2009, and Application No. 61/209,828, filed Mar. 12, 2009.

FIELD

The present disclosure relates generally to a system and method for creating a personalized advertisement based on detection of facial features from an uploaded photograph, including simulated product usage thereon, and optionally in recommending a product or service for trial.

BACKGROUND

With the exponential growth of pictures on the Internet, methods of automatically analyzing or processing these pictures are becoming more and more necessary. Signs of such systems can be found through the most popular sites on the Internet, including visual search websites that can search based on visual content, face defection filters on search engines such as Google, as well as automatic image matching applications that detect copyright infringement in images and video.

Digitally-based face detection in particular is finding its way into a variety of internet applications including head tracking for video conferencing, automatically locating faces in photos on social network websites, as well as various facial visual effects.

The detection of facial features has been described in prior patent disclosures by the inventor, and as a result will not be described again here. For more information, please refer to patent application Ser. No. 11/744,668 as well as other patents by the inventor.

BRIEF DESCRIPTION OF THE DRAWINGS

Embodiments will now be described by way of example only, with reference to the following drawings in which:

FIG. 1 shows a digital advertising framework where a digital advertisement, running on a website or running on a mobile phone or kiosk, may allow the user to upload their photo;

DETAILED DESCRIPTION

This description pertains to an automatic method of simulating cosmetic treatments/products on user uploaded photos automatically, and optionally recommending purchase, by a user, of a related product.

In overview, the method may incorporate the following steps: A splash page, video, or other visual suggesting to the user of the possibility of uploading his/her photo into the ad. The photo is then downloaded from the user's computer, digital camera or a kiosk, to the system's servers. The system automatically detects the face of the person in the photo, and uses the face location to estimate the facial feature locations. Based on the location of the face and facial features, the system performs a series of image processing sequences to specific regions of the face (with each region being related to the position of one or more facial features). Facial feature detection based on face location, and facial gradients plus colors, may be applied via simulation to the photo. Automatically, cosmetic, makeup, weight-loss, anti-aging, and/or other effects are applied to the photo based on the locations of the face and facial features.

The resulting photo may then be uploaded and displayed within the advertisement, showing, at the user's mobile device or a computerized advertising kiosk, the effects of a particular product or, the users photo, with the photo serving as a simulation of product usage and encouraging the user to buy the product. The user can then save, print, email, or upload their photo to another website/network/phone.

FIG. 1 shows a digital advertising framework where a digital advertisement (running on a website or running on a mobile phone or kiosk) may allow the user to upload their portrait image or photo into the application in order to instantly see a simulation representative of the particular product being advertised applied to their own face.

Rich media makeover ads may allow a rich interactive makeover application to be embedded in standard ad-sized units of any website. These applications allow the user to upload their photo or portrait image into the ad, thereby creating a personalized advertisement, possibly showing a product, effect, treatment, or scene on the user's face.

Figure 2:
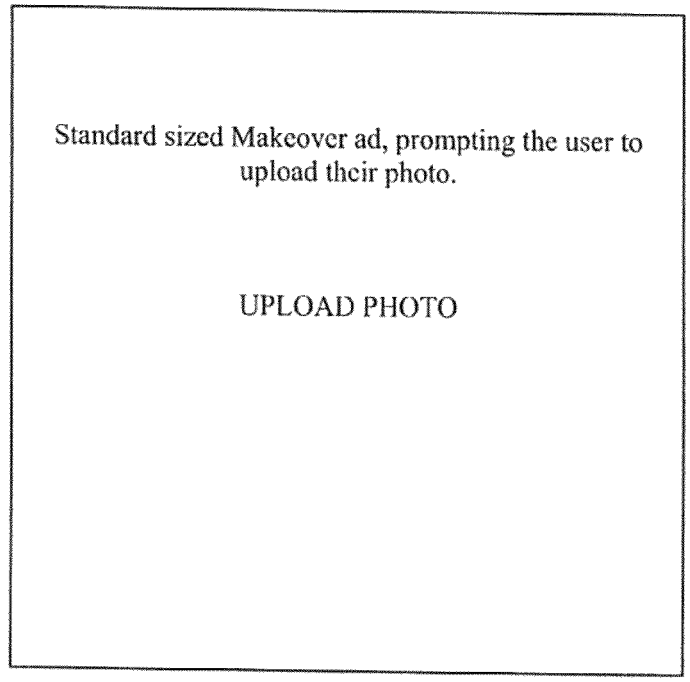
FIG. 2 shows a standard sized makeover ad, prompting the user to upload their photo.

FIG. 2 shows a standard sized makeover ad, which may be located at an advertising website, prompting the user to upload their photo, for example, for simulated trails of advertised products.

Figure 3:
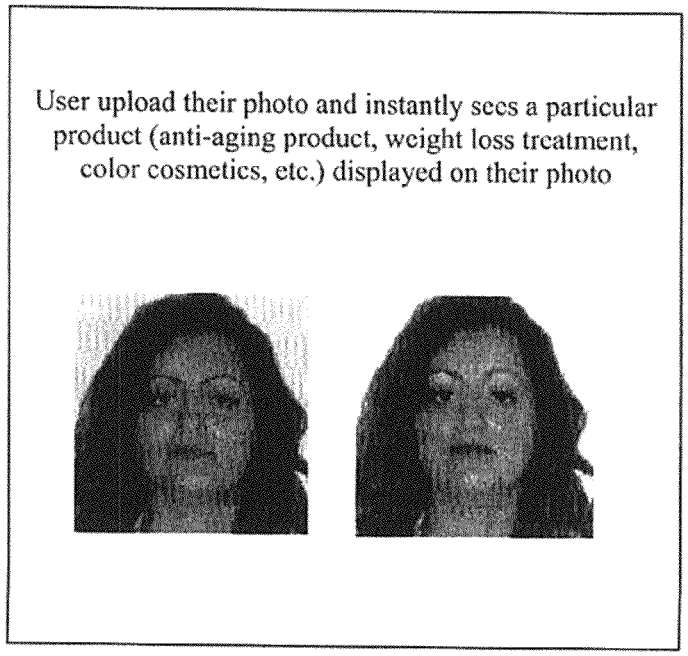
FIG. 3 shows a user photo uploaded into the makeover ad, and instantly seeing the results from simulated usage of a particular product, displayed on their photo.

FIG. 3 shows a user uploaded photo into the makeover ad, with the user instantly seeing the simulated results of applying a particular product, such as an anti-aging product, weight loss treatment product, color cosmetics product, etc., displayed on their photo.

Further examples of detecting some of the mentioned features from a user uploaded photo are as follows. Detecting any of the parameters of the face outlined above requires the use of a face and facial feature detector initially. In the following sections, it is assumed that the prior location of the face and the facial features are known.

Detecting Skin Color. Facial skin corresponds to the regions in the face that are not on the features (eyes, lips, nose, etc.). One method of obtaining skin pixels is as follows:

> Likelihood of pixel at location $(x,y)$ being
> skin=likelihood of pixel $(x,y)$ belonging to the
> face−likelihood of pixel $(x,y)$ belonging to a
> facial feature.

In estimate of the above formula would be to only include pixels that are on the face, but are not on the facial features. Once we have a subset of such pixels, a three dimensional RGB histogram can be made of the skin pixel colors. Once this histogram is complete, different distribution approximation models can be used to find the densest histogram location (in Red, Green, and Blue space). The average RGB value for this region may be used as the skin color base tone.

Detecting Hair Color. A similar method to the above procedure can be applied to the hair, consisting of selecting hair pixels which are close to, but not a part of, the face. Once these pixels are found, a RGB histogram may be made of the hair pixel colors.

Once this histogram is complete, different distribution approximation models can be used to find the densest histogram location (in Red, Green, and Blue space). The average RGB value for this region is used as the hair color base tone.

Detecting wrinkles and/or acne. A de-wrinkled image may generated by means of smoothing and/or maximum-surrounding-pixel selection. Once the original image is subtracted from the smoothed (or maximum-surround-pixel selected), the difference will be indicative of age and problem areas on the face.

Cosmetic color product simulation. Once the location of the face and the facial features is known, feature enhancement, via the application of various cosmetic coloring product options, can be simulated on the face, described in illustrative manner as follows.

Lip Coloring. In order to visualize different lip shades on the user-uploaded photograph, the location of the lips consisting of a box outlining the lips may be used (the "lip box"). A radial-gradient translucent colored mask, consisting of intense less translucent colors in the center and having increasing translucency in the outward radial directions may be weighted-averaged (with the weight being either preset or chosen by a user) within the boundary of the lip box), resulting in a slight colorization of all of the pixels within the lip box.

While such a colored mask would effectively color the lips as desired, it has two unwanted effects, namely the colorization of the skin around the lips, and the colorization of the teeth if any are shown. To reduce these effects, the following two further steps may be taken, as follows.

During the weighted-averaging of the original image with the colored mask, if the resulting pixel has any component (Red, Green, or Blue) which is lower in intensity than the original image by a certain threshold (lower than X % of the original component intensity, with X ranging from 50-100%), then the value of the original image is used instead.

Secondly, in order to minimize the discolouring effects especially on the teeth, the image contrast of the new colored lip may be increased (with the contrast increase either being preset or chosen by a user).

Once the newly colored lip is obtained, it may be seamlessly blended back into the original image by using a gradient mask to specify the rate of pixels to combine to obtain the resulting image. The gradient mask should result in mostly the new lip for the inner lip pixels and mostly the original lip for the outer lip pixels, where dark regions in the original image correspond to higher weights for the new lip (and lower Weights for the old lip), and lighter regions correspond to lower weights for the new lip.

Optionally, different lip colors may be used along with multiple blending masks in order to create a multi-tone color effect on the lips.

Eye Definition. In order to visualize various cosmetics for the eyes or eyebrows (including eyelash extension, eye shadow, and other eye makeup treatments/products), the definition of the eye may increased through the following steps, where again a boundary box may be used as an indication of a given eye region. The image contrast in each boundary box may be increased so as to simulate the application of cosmetic color products. The resulting high-contrast eye may be blended back (using a gradient blending mask, similar to the one discussed above which is used to blend the recolored lips back into the photograph) in the original image. To simulate specific eye treatments, such as eyebrow coloring, upper eye shadow, lower eye shadow, etc., only specific sections of the high-contrast eye may be blended back into the original image.

Foundation/Blush/Cheeks. Different regions of the face can be colored by using a gradient translucent color mask applied to each part of the face. In other words, different part of the face, such as below the left and right eye boxes) may be colored by a certain amount (0-100%), with the amount defining the percentage of the new color that is blended with the original color.

In any of the above cases, multiple product types, colors and styles may be shown and offered to a user to try, allowing a user to try combinations of products via visualizations by simulated usage on their photographs. The user may interact and apply products to their photos (by simulated usage) via a website, a standalone kiosk or a mobile device.

Figure 4:
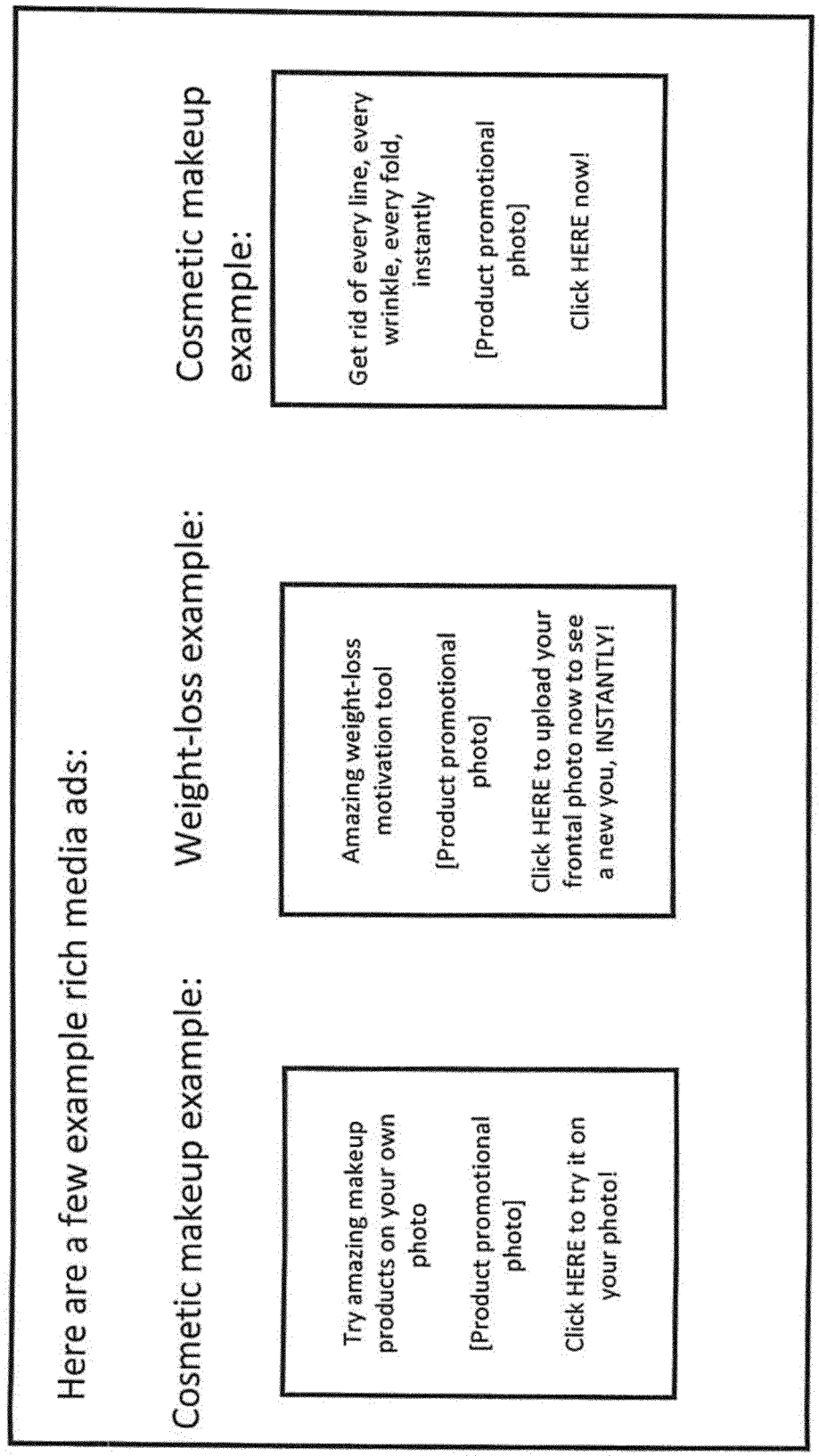
FIG. 4 shows exemplary rich media makeover ads, which when personalized with a user-uploaded photo, target or recommend a particular product to the user.

FIG. 4 shows examples where rich media makeover ads, after the user uploads a photo to personalize the ad, can target or recommend a particular product to the person uploading their photo. By analyzing the photo, it is possible to extract personal information, automatically such as age, sex, skin color, hair color, mouth openness, nose shape, lip shape, eye shape, skin features and anomalies, and so forth. For example, such an ad could automatically detect the age of the person and then suggest or recommend treatment using an age-appropriate skin cleansing cream. The feature detection method may utilize skin, color, edge and texture information to locate the skin, the eyes and the lips, in order to automatically place simulated products/effects at the appropriate locations on the image.

Although the invention has been described with reference to specific exemplary embodiments in the disclosure herein, varying modifications thereof will be apparent to those skilled in the art without departing from the scope of the invention as defined by the appended claims.

What is claimed is:

1. A method, executed in a computing device, of personalizing a product advertisement comprising:
   receiving, at the computing device, a digital product advertisement including therewithin a placeholder or a call to action for a photograph;
   receiving a facial photograph, the facial photograph including a plurality of facial features;
   detecting at least one facial feature of the plurality of facial features;
   modifying the at least one facial feature by simulating usage thereon of the product being advertised;
   replacing the at least one facial feature with the modified at least one facial feature to create a modified facial photograph;
   generating, as a personalized product advertisement, the modified facial photograph within the digital product advertisement; and
   providing the personalized product advertisement for display on a user interface to a consumer.

2. The method of claim 1 comprising receiving the facial photograph at an advertising website.

3. The method of claim 1 wherein the facial photograph is automatically uploaded from a user's public photographs.

4. The method of claim 1 wherein the facial photograph and the modified facial photograph are used as part of the personalized advertisement for the product being advertised.

5. The method of claim 1 wherein the at least one facial feature comprises an eye region, and modifying the eye region comprises:
   increasing a contrast of an original eye image within an eye box defining the eye region; and blending the contrast as increased back into the original eye image using at least one selective blending mask applied to at least one pre-determined location of the eye box.

6. The method of claim 1 wherein the at least one facial feature comprises a lip region, and modifying the lip region comprises:
applying at least a partially translucent color overlay on an original lip image within a lip box defining the lip region, the color overlay being applied to recolor the lip image based on either a predetermined or user-selected color;
applying a predetermined gradient coloring mask;
applying a maximum filter such that if any blended pixel is darker by a predetermined threshold ranging between 50 to 100 percent of an original pixel color, then the original pixel color is used to recolor the lip image;
increasing an image contrast of the recolored lip image; and
blending the recolored increased contrast lip image back into the original lip image using at least one selective blending mask applied to a pre-determined location within the lip box.

7. The method of claim 1 further comprising modifying the at least one facial feature by simulating usage thereon of multiple products, colors, and styles being advertised.

8. The method of claim 1 comprising receiving the facial photograph at any one of a class of computers consisting of a mobile device and a computerized advertising kiosk.

9. The method of claim 1 wherein the at least one facial feature is detected using a feature detection method utilizing skin, color, edge and texture information to locate skin, eyes, and lips.

10. A computer-implemented method of recommending a product being advertised comprising:
receiving at a computing device, a facial photograph;
detecting at least one feature from the facial photograph, the feature comprising at least one of age, sex, skin color, hair color, mouth openness, nose shape, lip shape, eye shape, skin features, wrinkles, acne, or anomalies;
extracting age, sex, skin color, hair color, mouth openness, nose shape, lip shape, eye shape, skin features, wrinkles, acne, or anomaly information by analyzing the at least one feature;
generating a recommendation, at the computing device, for an appropriate product based on the information as extracted and the product being advertised;
simulating usage of the appropriate product on at least one facial feature of the facial photograph to create a modified facial photograph; and
providing the modified facial photograph for display on a user interface to a consumer.

11. The method of claim 10 wherein the information as extracted relates to hair color.

12. The method of claim 10 wherein the information as extracted further relates to skin color.

13. The method of claim 10 wherein the information as extracted relates to age.

14. The method of claim 10 wherein the information as extracted relates to a facial feature selected from a set of facial features consisting of: mouth openness, nose shape, lip shape and eye shape.

15. A computer-implemented method of recommending an anti-aging or skin treatment service or product being advertised comprising:
receiving at the computing device, a facial photograph;
detecting at least one feature from the facial photograph, the feature comprising detecting at least one of age, sex, skin color, hair color, mouth openness, nose shape, lip shape, eye shape, skin features, wrinkles, acne, or anomalies;
extracting age, sex, skin color, hair color, mouth openness, nose shape, lip shape, eye shape, skin features, wrinkles, acne, or anomaly information by analyzing the at least one feature;
generating, at the computing device, a recommendation of the anti-aging or skin treatment service or product being advertised;
simulating usage of the anti-aging or skin treatment service or product on at least one facial feature of the facial photograph to create a modified facial photograph; and
providing the modified facial photograph for display on a user interface to a consumer;
wherein the anti-aging or skin treatment service or product relate to the information as extracted.

16. The method of claim 15 wherein the recommended service relates to an anti-aging treatment.

17. The method of claim 15 wherein the recommended service relates to a skin treatment.

18. A computer program product comprising a non-transitory storage medium having instructions stored thereon which when executed cause a computer device to personalize a product advertisement, comprising:
receiving, at the computing device, a digital product advertisement including therewithin a placeholder or a call to action for a photograph;
receiving a facial photograph, the facial photograph including a plurality of facial features;
detecting at least one facial feature of the plurality of facial features;
modifying the at least one facial feature by simulating usage thereon of the product being advertised;
replacing the at least one facial feature with the modified at least one facial feature to create a modified facial photograph;
generating, as the personalized product advertisement, the modified facial photograph within the digital product advertisement; and
providing the personalized product advertisement for display on a user interface to a consumer.

19. A computer program product comprising a non-transitory storage medium having instructions stored thereon which when executed cause a computer device to recommend a product being advertised comprising:
receiving at a computing device, a facial photograph;
detecting at least one feature from the facial photograph, the feature comprising at least one of age, sex, skin color, hair color, mouth openness, nose shape, lip shape, eye shape, skin features, wrinkles, acne, or anomalies;
extracting age, sex, skin color, hair color, mouth openness, nose shape, lip shape, eye shape, skin features, wrinkles, acne, or anomaly information by analyzing the at least one feature;
generating a recommendation, at the computing device, for an appropriate product based on the information as extracted and the product being advertised;
simulating usage of the appropriate product on at least one facial feature of the facial photograph to create a modified facial photograph; and
providing the modified facial photograph for display on a user interface to a consumer.

20. A computer program product comprising a non-transitory storage medium having instructions stored thereon which when executed cause a computer device to recommend an anti-aging or skin treatment service comprising:

receiving at the computing device, a facial photograph;
detecting at least one feature from the facial photograph, the feature comprising detecting at least one of age, sex, skin color, hair color, mouth openness, nose shape, lip shape, eye shape, skin features, wrinkles, acne, or anomalies;
extracting age, sex, skin color, hair color, mouth openness, nose shape, lip shape, eye shape, skin features, wrinkles, acne, or anomaly information by analyzing the at least one feature;
generating, at the computing device, a recommendation of the anti-aging or skin treatment service related to the information as extracted;
simulating usage of the anti-aging or skin treatment service on at least one facial feature of the facial photograph to create a modified facial photograph; and
providing the modified facial photograph for display on a user interface to a consumer.

\* \* \* \* \*